UNITED STATES PATENT OFFICE.

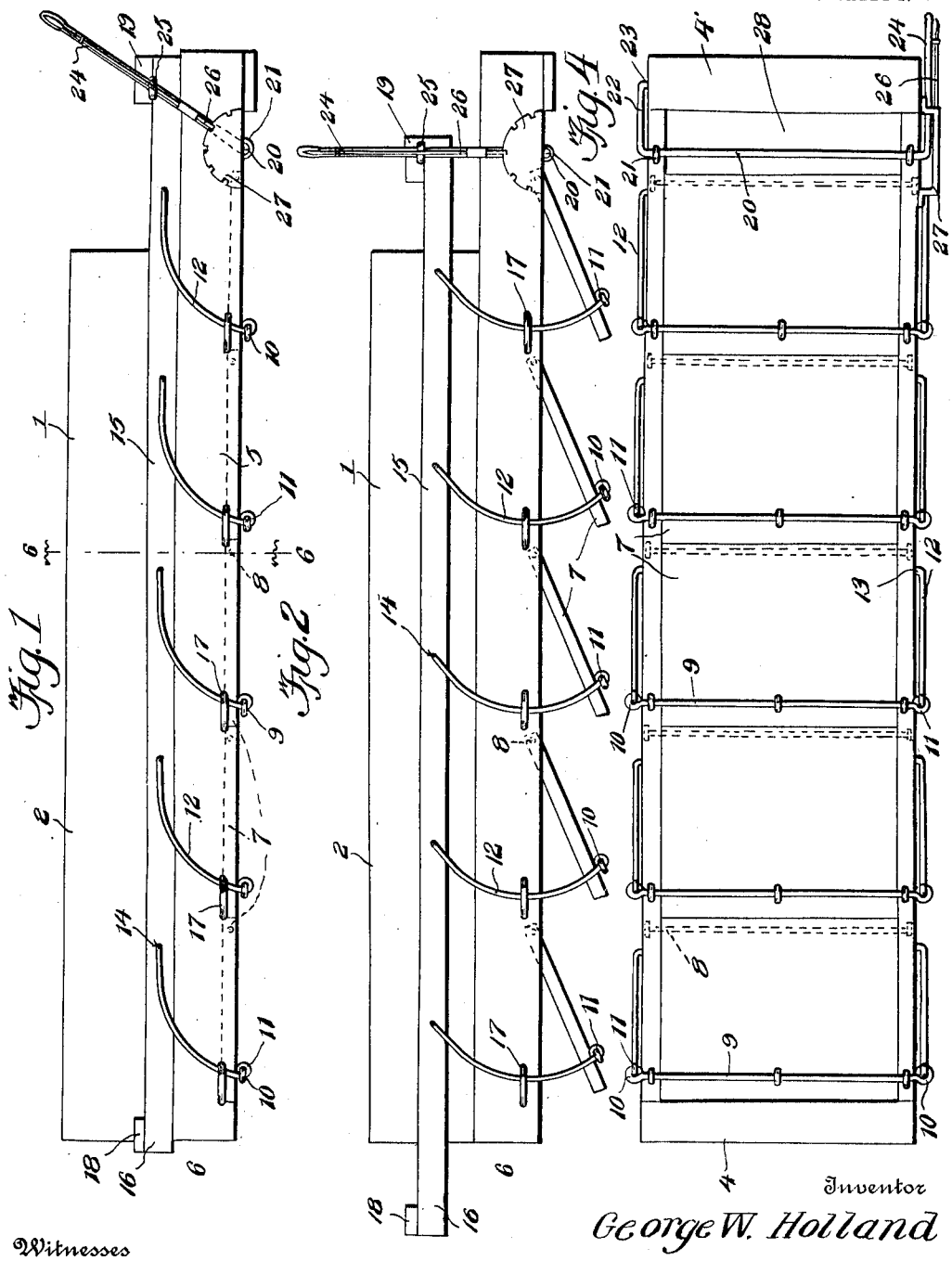

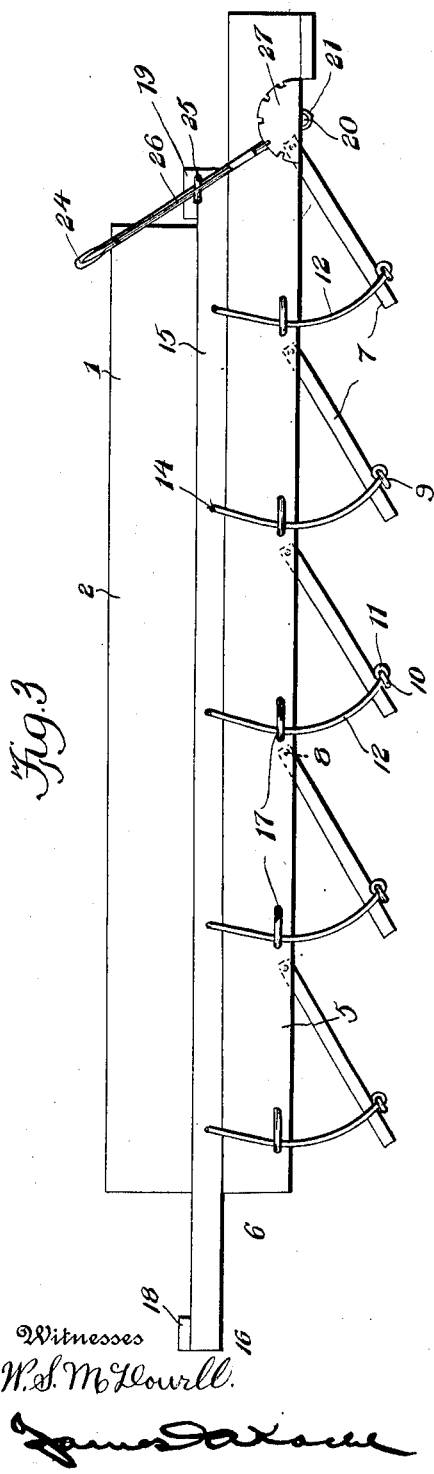
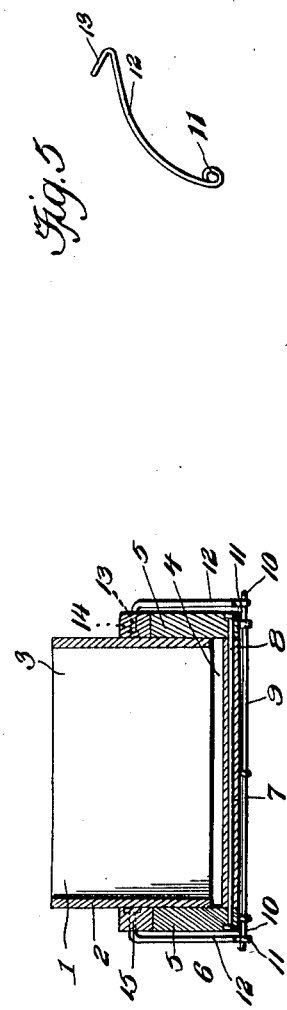

GEORGE W. HOLLAND, OF TOMBSTONE, ARIZONA.

DUMPING-WAGON.

1,020,823.        Specification of Letters Patent.        Patented Mar. 19, 1912.

Application filed February 4, 1911.  Serial No. 606,562.

*To all whom it may concern:*

Be it known that I, GEORGE W. HOLLAND, a citizen of the United States of America, residing at Tombstone, in the county of Cochise and State of Arizona, have invented new and useful Improvements in Dumping-Wagons, of which the following is a specification.

This invention relates to dumping wagons, and has for an object to provide improved mechanism embodying a plurality of movable gates in the bottom of the wagon box and movable means manually actuated for moving the gates simultaneously to open or closed positions.

In the drawings, forming a portion of this specification and in which like numerals of reference indicate similar parts in the several views:—Figure 1 is a side view of the dumping wagon showing the gates in closed positions. Fig. 2 is a similar view showing the gates in partly open positions. Fig. 3 is a similar view showing the gates in full open positions. Fig. 4 is a bottom plan view of the box showing the gates in closed positions. Fig. 5 is a perspective view of one of the links. Fig. 6 is a section taken on the line 6—6 of Fig. 1.

The dumping wagon comprises a body 1 which is provided with the parallel sides 2 and the vertical ends 3. The body 1 has its sides 2 and rear end 3 suitably secured to the end bar 4 and the longitudinal side bars 5 of a rectangular frame 6. This frame is disposed lowermost in the wagon box, and as shown, it is provided in its bottom with a plurality of normally horizontally disposed gates 7. These gates are identically constructed, and as shown, they are provided at their sides at points near their forward ends with trunnions 8 which are mounted in the longitudinal side bars 5, as shown.

On the underside, near the rear end, each gate has fixed thereto a bar 9 which is provided at its ends with eyes 10 which extend slightly beyond the side bars 5. These eyes are pivotally connected with the eyes 11 in substantially arcuate links 12. The other ends of these links are provided with inwardly extending trunnions 13 which are mounted in correspondingly formed passages 14 in the side bars 15 of a movable frame 16. Suitable guides 17 are secured to the side bars 5 of the fixed frame of the wagon box and they are adapted to guide the links 12 in their movements.

The movable frame 16 has its side bars 15 connected at their rear ends by a cross bar 18 and at the front ends the said side bars are connected by a cross bar 19. A substantially U-shaped member 20 is pivoted to the undersides of the side bars 5 near their front ends, as at 21, and as illustrated, the side member 22 of this member extends upwardly against one of the side bars 5 and its terminal is formed to provide a trunnion 23 which is suitably mounted in one of the side bars 15. The opposite side bar 15 is formed to provide a controlling lever 24 which extends through the eye 25 which is pivotally mounted on the opposite side bar 15. The lever 24 is provided with a suitable well known form of pawl or locking dog 26 which is designed to engage the rack segment 27 at one side of the frame 6. The front bar 4' of the fixed frame 6 has secured thereto a downwardly inclined footboard 28 which extends in the direction of the bottom of the wagon box.

From the construction described it will be seen that the side bars 15 of the movable frame are accurately guided in their movements by the vertical sides of the wagon box, and in view thereof, the links 12 will be held against lateral strain. Normally the side bars 15 of the movable frame lie directly upon the upper surfaces of the side bars 5 of the fixed frame substantially throughout the length of the bars 5, as shown in Fig. 1 of the drawings.

In operation, when it is desired to dump the load the controlling lever 24 is moved rearwardly so as to move the movable frame 16 upwardly and rearwardly and downwardly so that the forward pivoted ends of the links will be disposed substantially immediately above the guides 17. In this position of the links the gates will be in their full open positions, and as shown in Fig. 3 of the drawings, the side bars 15 of the movable frame rest directly upon the upper surfaces of the side bars 5 of the fixed frame so that the weight of the load to be dumped will be equally distributed to the gates and to the movable frame.

In practice it has been found that the trunnion 23 of the U-shaped member 20 is sufficient to lift the frame 16 in the operation of the lever 24, and the lever 24 by its engagement with the eye 25 which is pivotally secured to one of the side bars 15 of the frame 16 has a tendency to coöperate with the trunnion in this lifting action by means of the frictional contact between the said lever 24 and eye 25. This lifting of the frame reduces the friction between the links 12 and the guides 17, in the operation of the gates, thereby reducing the wear on the parts to a minimum.

I claim:—

1. A dumping wagon comprising a box, a fixed frame mounted thereon, a plurality of movable gates carried by the fixed frame and normally closing the bottom of the box, a movable gate-controlling frame wholly contacting with the fixed frame on open or closed positions of the gates, operative connections between the movable frame and the gates for moving the gates on movement of the movable frame, and a controlling lever connecting the fixed frame with the movable frame.

2. A dumping wagon comprising a box, a fixed frame mounted thereon, a plurality of movable gates carried by the fixed frame and normally closing the bottom of the box, a movable gate-controlling frame contacting with the fixed frame in open or closed position of the gates, operative connections between the movable frame and the gates for moving the gates on movement of the movable frame, a substantially U-shaped member pivoted to the fixed frame, connections between said member and movable frame and a controlling lever for operating said member to move the movable frame to open or close the gates.

3. A dumping wagon comprising a box, a fixed frame mounted thereon, a plurality of movable gates carried by the fixed frame and normally closing the bottom of the box, a movable gate-controlling frame contacting with the fixed frame in open or closed position of the gates, a substantially U-shaped member pivotally connected to the under side of the fixed frame, one end of said member forming a trunnion for supporting the movable frame, a controlling lever formed upon the opposite end of said member, and means carried by the movable frame and engaging said controlling lever, said last-named means and said trunnion serving to move the movable frame in the operation of the lever.

In testimony whereof I affix my signature in presence of two witnesses.

GEORGE W. HOLLAND.

Witnesses:
DANIEL McFARLAND,
JAMES F. DUNCAN.

---

Copies of this patent may be obtained for five cents each, by addressing the "Commissioner of Patents, Washington, D. C."